No. 789,211. PATENTED MAY 9, 1905.
J. T. DUFF.
PULLEY.
APPLICATION FILED AUG. 12, 1904.
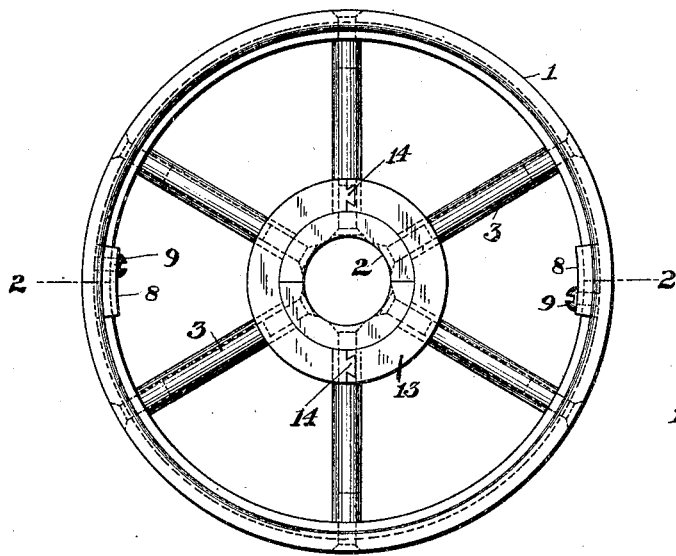
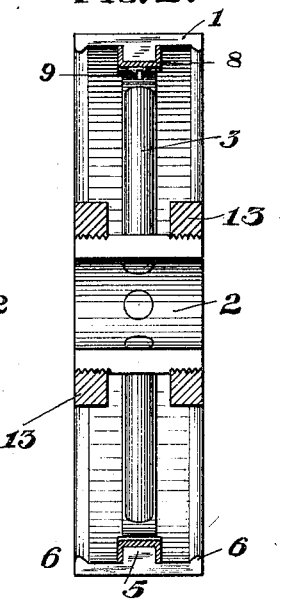
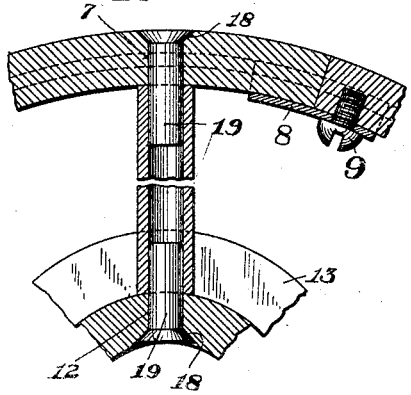
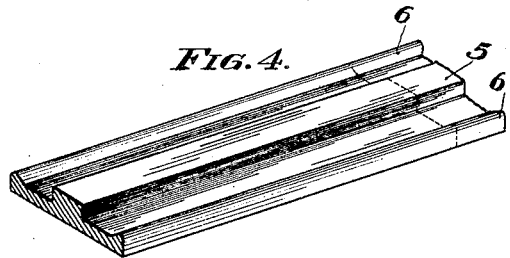
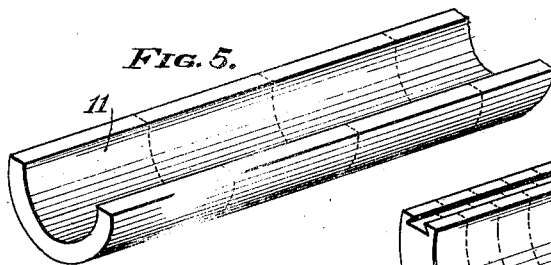
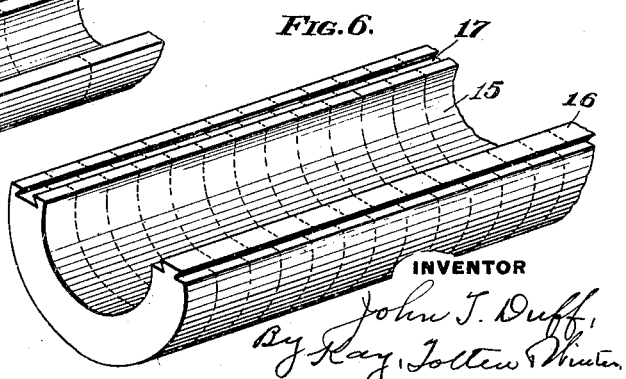
WITNESSES
Walter Damaries
G. Kremer
INVENTOR
John T. Duff,
By Kay, Totten & Winter
His Attys.

No. 789,211. Patented May 9, 1905.

UNITED STATES PATENT OFFICE.

JOHN T. DUFF, OF PITTSBURG, PENNSYLVANIA.

PULLEY.

SPECIFICATION forming part of Letters Patent No. 789,211, dated May 9, 1905.

Application filed August 12, 1904. Serial No. 220,539.

*To all whom it may concern:*

Be it known that I, JOHN T. DUFF, a resident of Pittsburg, in the county of Allegheny and State of Pennsylvania, have invented a new and useful Improvement in Pulleys; and I do hereby declare the following to be a full, clear, and exact description thereof.

My invention relates to pulleys, and more especially to that class of pulleys which are formed in sections, so that they can be removed from or placed on long shafts without disturbing the latter in their hangings, and ordinarily known as "split pulleys."

The object of my invention is to provide a pulley of the character above named which is simple in construction, can be easily applied to or removed from the shaft, which is strong and secure when in place, and which can be cheaply and easily manufactured.

To these ends the invention consists, generally stated, in constructing such pulleys in such a manner that most parts thereof can be formed by rolling and dispensing largely with special forgings or castings.

More specifically, the invention consists in providing a rim comprising sections each composed of a rolled bar provided with a thickened portion or rib at its central portion for receiving the spoke-seats and flanges at the edges thereof for strengthening the same, also in a hub consisting of two semitubular sections, which may be formed by rolling a bar with concave and convex inner and outer faces and cutting the same to desired length, said hub-sections being held together and clamped upon the shaft by means of partible collars or nuts, also in providing tubular spokes and securing the same to the rim or hub, or both, by means of rivets or like headed members passed through holes in the rim or hub and having their shanks projecting into the ends of the tubular spokes and the latter shrunk down onto said shanks.

The invention also consists in details of construction, which will be hereinafter described and claimed.

In the accompanying drawings, Figure 1 is a side view of my improved pulley, showing the same applied to a shaft. Fig. 2 is a section thereof on the line 2 2, Fig. 1. Fig. 3 is a sectional view through the rim and hub, showing the manner of securing the spokes in place. Fig. 4 is a perspective view of a rolled bar suitable for forming the rim-sections. Fig. 5 is a similar view of a bar for forming the hub-sections, and Fig. 6 is a similar view of a bar for forming the hub nuts or collars.

My pulley comprises a rim 1, hub 2, and spokes 3. The rim and hub are formed in two sections, as shown in Fig. 1, thus enabling the pulley to be parted for applying to or removing from the shaft in a well-understood manner.

All parts of the pulley shown are formed of wrought metal and can be formed either from rolled bars or other commercial forms, such as tubes and rivets. The rim-sections 1 are formed from a rolled bar, such as shown at Fig. 4, provided on one face with a central thickened portion or rib 5 and edge ribs 6. This bar is cut into suitable lengths, which are then bent into semi-annular form, with the ribs 5 and 6 projecting inwardly, thus giving a smooth outer surface for receiving the band or the like. The ribs 5 and 6 serve to strengthen the rim, and as a consequence the latter can be made of minimum weight and still have the requisite strength. The central rib 5 also gives a thickened portion of metal for the attachment of the spokes, said rim and rib being provided with spoke-receiving openings 7. The rim-sections are secured to each other by means of clips or clamps 8 embracing the rib 5 at the meeting ends of the two sections and suitably secured to one or both sections by means of screws 9. These clips serve largely to prevent lateral displacement of the rim-sections, outward and radial displacement being prevented by the spokes which unite the rim to the hub. The hub 2 is also formed of two sections, each being semitubular in shape and having plain cylindrical inner and outer faces. These hub-sections can also be formed from an ordinary rolled bar, such as shown at 11, Fig. 5, which bar will be cut into suitable lengths, as indicated by dotted lines in Fig. 5, and these sections are then assembled in the manner to be described. These hub-sections are provided with holes 12 for receiving the inner ends of the spokes. They are clamped together and onto the shaft by means of suitable collars 13. Preferably these collars will be nuts, and the hub-sections will be threaded on their outer faces at their ends for receiving said nuts. The threads preferably will be slightly tapered in a well-known manner, so that when the nuts are tightened up they will clamp the two hub-sections firmly upon the shaft. The nuts 13 also are partible, being formed of two semi-annular sections, which are united in any suitable way, such as providing them with dovetailed or interlocking ends 14. These nut-sections may be formed in the same manner as the hub-sections, being cut off from the ends of rolled bars 15, and which are provided with dovetailed ribs 16 and grooves 17 on their edges, as shown in Fig. 6. The cut-off sections are assembled in pairs to form the complete nut, and the latter is then threaded. The ribs 16 may both be on one section and the grooves 17 both be in the other section, as shown in Fig. 1, or each section may be provided with one rib and one groove, as shown in Fig. 6. The spokes 3 also are of special form, preferably being sections of tubes extending from the hub to the rim, or at least being provided with tubular ends. The holes 7 in the rim-sections and 12 in the hub-sections are countersunk, as at 18, and the spokes are secured in place by means of rivets 19 or similar headed members whose heads are received in the countersinks 18 and the shanks passed through the holes 7 and 12 and into the tubular ends of the spokes. The spoke ends will be heated before assembling, while the rivets will be cold, so that when the spokes cool they will shrink down upon the shanks of the rivets, thus forming a secure connecting means and without the necessity of welding, upsetting, or threading.

Many parts of the construction above described may be changed within limits without departing from my invention. For instance, the manner shown for connecting the spokes need not necessarily be employed at both the hub and the rim, as it may be employed only at one end of the spokes. It is preferred, however, to use the same at both ends. So, too, the special form of rim shown and the special form of hub shown may each be used with some other form of hub or rim and may also have the spokes secured therein in some other manner than shown and described.

It will be observed that all portions of this pulley are formed of wrought metal and no part thereof requires any special forging or upsetting. The rim and hub sections are formed from ordinary rolled bars cut to the desired length, the rim-sections being afterward bent into semi-annular form, which can be easily and conveniently done when cold in suitable dies. The partible nuts also are formed from rolled bars having dovetailed grooves and tongues formed on their edges, as can be conveniently done by planing or milling, and then cut into sections, assembled, and threaded. The spokes also are ordinary tubes which can be bought in the open market, and the securing means—namely, the rivets—can likewise be bought in the open market. As a result the cost of construction is a minimum and the pulley is exceedingly strong, although light. It is so constructed that it can be readily applied to or removed from the shaft with the use of such tools as are ordinarily at hand.

It will be understood that this construction may be used not only for pulleys, but also for wheels.

What I claim is—

1. In a device of the character specified, the combination with a partible hub, of two semi-annular rim-sections each comprising an integral rolled bar having a thickened central portion, and spokes secured to the hub and to the thickened central portion of the rim-sections.

2. In a device of the character specified, the combination with a partible hub, of two semi-annular rim-sections each formed from an integral rolled bar having an inwardly-projecting thickened central portion, and spokes secured to the hub and to said thickened central portion of the rim.

3. In a device of the character specified, the combination with a partible hub, of a rim comprising two semi-annular sections each formed of an integral rolled bar having an inwardly-projecting rib located centrally thereof and inwardly-projecting ribs at the edges thereof, and spokes secured to the hub and the central rib of said rim-sections.

4. In a device of the character specified, the combination with a partible hub, of a rim comprising two semi-annular sections each formed from an integral rolled bar having an inwardly-projecting rib at its central portion, spokes secured to the hub and to said rib, and clips embracing the ribs of said sections at their end portions and secured thereto.

5. In a device of the character specified, the combination with a partible rim, of a hub comprising two semitubular rolled sections, partible collars engaging the ends of said hub-sections and securing the same together, and spokes connecting said hub and rim.

6. In a device of the character specified, the combination with a partible rim, of a hub comprising two semitubular rolled sections provided with semicylindrical inner and outer faces, partible collars engaging the ends of said sections and serving to secure the same together, and spokes connecting said hub and rim.

7. In a device of the character specified, the combination with a partible rim, of a hub comprising two semitubular rolled sections having threads formed on their outer faces at their ends, partible nuts on said threaded portions and serving to secure the hub-sections together, and spokes connecting said hub and rim.

8. In a device of the character specified, the combination with a partible rim, of a hub comprising two semitubular rolled sections, collars on the ends of said hub-sections, said collars each comprising two sections provided with interlocking ends, and spokes connecting said hub and rim.

9. In a device of the character specified, the combination with a partible rim, of a hub comprising two semitubular rolled sections threaded on their outer faces at their ends, nuts on said threaded portions and each comprising two semi-annular sections provided with interlocking ends, and spokes connecting said hub and rim.

10. In a device of the character specified, the combination with a partible rim, of a hub comprising two semitubular rolled sections having threads on their outer faces at their ends, spokes connecting said hub and rim sections, and nuts on the threaded portions of said hub-sections, said nuts comprising two semi-annular sections provided on their ends with interlocking dovetailed recesses and projections.

11. In a device of the character specified, the combination of a partible hub comprising two semitubular rolled sections, partible collars for holding said hub-sections together, a partible rim comprising sections of an integral rolled bar having a thickened central portion, and spokes connecting said hub and rim.

12. In a device of the character specified, the combination with a hub, of a rim provided with holes therethrough, spokes connecting the hub and rim and comprising members extending from the rim to the hub and having tubular outer ends, and headed members passing through the openings in the rim and having their shanks projecting into the tubular ends of the spokes and having the latter shrunk thereupon.

13. In a device of the character specified, the combination with a rim, of a hub provided with holes therethrough, spokes connecting the hub and rim and comprising members extending from the rim to the hub and having tubular inner ends, and headed members extending through the openings in the hub with their shanks projecting into the tubular ends of the spokes and having the latter shrunk thereupon.

14. In a device of the character specified, the combination with a hub and rim provided with holes therethrough, of spokes comprising members extending from the rim to the hub and provided with tubular ends, and headed members passing through the holes in the hub and rim and having their shanks projecting into the tubular ends of the spokes and having the latter shrunk thereupon.

15. In a device of the character specified, the combination with a hub and a rim provided with holes therethrough, of spokes comprising tubes extending from the rim to the hub, and rivets passing through the holes in the hub and rim and extending into the ends of the tubes and having the latter shrunk thereupon.

16. In a device of the character specified, the combination with a hub, of a rim provided with holes therethrough and countersunk on the outer face, spokes comprising members extending from the rim to the hub and having tubular outer ends, and headed members having their heads located in the countersinks of the rim and their shanks extending through said rim and into the tubular ends of the spokes and having the latter shrunk thereupon.

17. In a device of the character specified, the combination with the hub and rim provided with holes therethrough countersunk on one side, of spokes comprising tubes extending from the hub to the rim, and securing means provided with heads located in the countersinks of the rim and hub and projecting into the tubes.

18. In a device of the character specified, the combination with a hub, of a rim provided with an inwardly-projecting rib located centrally thereof and having holes passing through said rim and said rib, spokes comprising members extending from the hub to the rim and provided with tubular outer ends, and headed members passing through the holes in the rim and into the tubular ends of the spokes and having the latter shrunk thereupon.

In testimony whereof I, the said JOHN T. DUFF, have hereunto set my hand.

JOHN T. DUFF.

Witnesses:
  ROBERT C. TOTTEN,
  G. KREMER.